Figure 1:
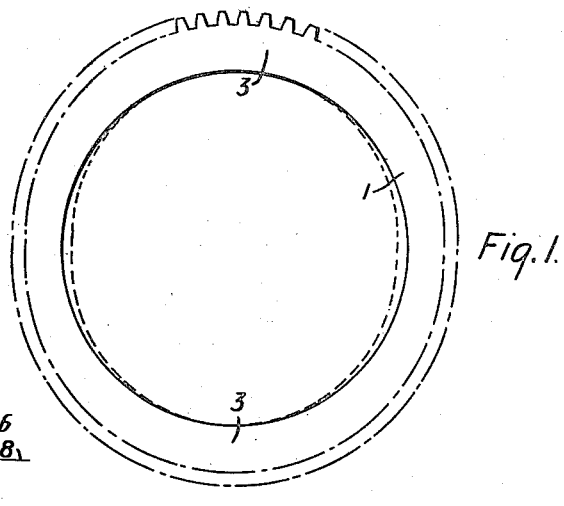

G. M. EATON.
DRIVING CONNECTION.
APPLICATION FILED DEC. 9, 1916.

1,280,000.

Patented Sept. 24, 1918.

WITNESSES:
Fred. A. Lind.
W. C. McCoy.

INVENTOR
George M. Eaton
BY
Wesley G. Carr
ATTORNEY

UNITED STATES PATENT OFFICE.

GEORGE M. EATON, OF PITTSBURGH, PENNSYLVANIA, ASSIGNOR TO WESTINGHOUSE ELECTRIC & MANUFACTURING COMPANY, A CORPORATION OF PENNSYLVANIA.

DRIVING CONNECTION.

1,280,000.　　　　Specification of Letters Patent.　　Patented Sept. 24, 1918.

Application filed December 9, 1916. Serial No. 136,019.

*To all whom it may concern:*

Be it known that I, GEORGE M. EATON, a citizen of the United States, and a resident of Pittsburgh, in the county of Allegheny and State of Pennsylvania, have invented a new and useful Improvement in Driving Connections, of which the following is a specification.

My invention relates to wheels and particularly to gear wheels that are employed in connection with vehicles or which transmit power through connecting rods and the like.

One object of my invention is to mount an unavoidably warped gear rim, having a non-circular pitch line, upon a hub in such manner that the best available intermeshing of gear and pinion teeth will be insured.

Another object of my invention is to provide a gear wheel which is purposely distorted in order to insure exact intermeshing of the gear teeth when the distance between the centers of the gear wheel and the engaging pinion is periodically changed by the thrust upon the gear wheel.

It has been found, in the art of gear manufacture, that, when a gear wheel is constructed from a hub and a rim, it is desirable to machine the rim and give the same a subsequent heat treatment to insure the proper tempering thereof. The heat treatment through which it is necessary to pass the rim causes a material distortion of the same which must be compensated for to insure proper intermeshing of the gear teeth. It has been found necessary to rebore the gear rim, or grind the same, to a true circular opening in order to avoid dangerous internal strains which would otherwise be set up in the gear rim when the same is shrunk on, or otherwise secured to, the hub member. Cutting away the center of the gear rim to a true circular form leaves the tooth pitch-non-circular and produces a rim of varying peripheral thickness. When such a gear is meshed with a driving pinion, the gear teeth on the thick portion of the rim tend to bind with the pinion teeth unless some compensation is made for the variation in the thickness of the rim.

My invention provides that the gear rim shall be mounted upon the hub in such relation to the pinion and the connecting rod that the lateral displacement of the gear wheel, due to the pull of the connecting rod on the crank pin, shall have the least harmful effect upon the satisfactory intermeshing of the above-described distorted rim and the coöperating pinion. Furthermore, my invention provides an eccentrically-mounted circular rim the distortion of which compensates for the lateral displacement of the gear wheel relatively to the intermeshing pinion and thereby maintains the distance between the center of curvature of the rim and the center of the pinion substantially constant.

Figure 2:
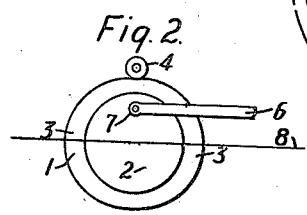
Figure 3:
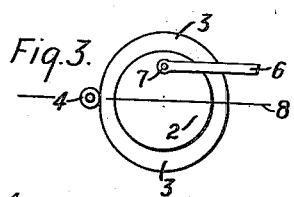
Figure 4:
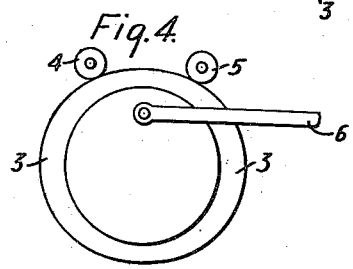
Figure 5:
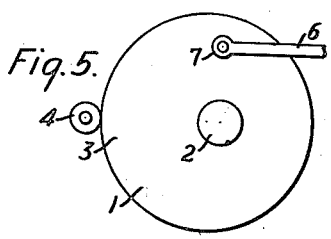
Figure 6:
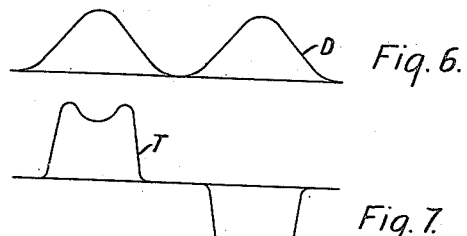
Figure 7:
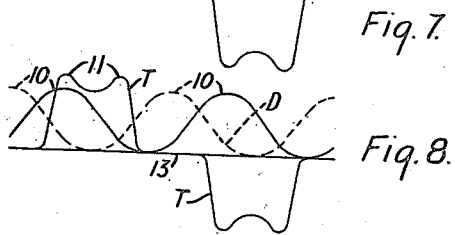
Figure 8:
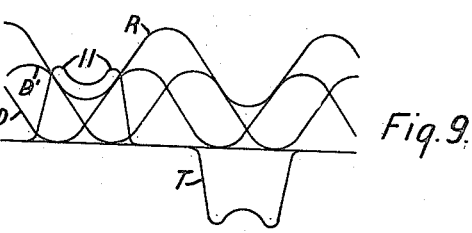
Figure 9:
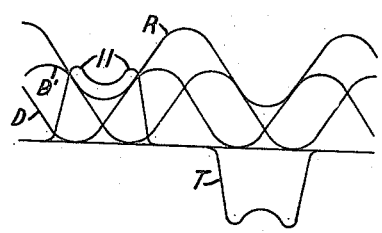
Figure 10:
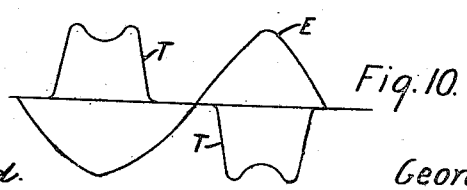

Figure 1 of the accompanying drawing illustrates an unavoidably warped rim having a circular internal bore, Fig. 2 shows a more or less diagrammatic view of a warped gear rim mounted upon a hub member to secure the best obtainable intermeshing of teeth when a single pinion is employed. Fig. 3 shows the best intermeshing of rim and pinion teeth that can be secured when a single pinion is employed which is mounted on a wheel radius parallel to the direction of thrust upon the connecting rod. Fig. 4 illustrates a gear wheel intermeshing with a pair of pinions. Fig. 5 shows an eccentrically-mounted rim meshing with a single pinion. Fig. 6 is a curve showing the degree of variation in the radius of a gear wheel embodying a typically warped rim. Fig. 7 is a curve representing the thrust exerted by a typical crank pin during a complete revolution of the wheel. Fig. 8 illustrates the relative positions of the thrust and radius-variation curves for the worst and also for the most favorable location of the rim relative to the hub. Fig. 9 illustrates the conditions prevailing when a pair of pinions intermesh with a warped rim, as shown in Fig. 4. Fig. 10 illustrates the conditions prevailing in the structure shown in Fig. 5.

The gear rim shown in Fig. 1 has been machined to a true cylindrical form having a circular-tooth pitch line but, in the process of heat treatment, the rim has been distorted to the oval form shown in dotted outline. During the subsequent machining of the rim 1 preparatory to mounting the same upon a hub member 2, the rim is ground to a true cylindrical form, as shown in solid outline. During this latter machining operation, it is relatively easy to locate the thickest portion 3 of the rim and mark the same for later identification, since the last black or uncut portion appearing on the inside of the bore will be on the thickest part of the rim. The rim 1 is then mounted upon the hub member 2 so that the thick portion 3 shall be located at the least mean distance from the points of intermeshing of a plurality of driving pinions 4 and 5 with the rim 1 when maximum thrust is exerted upon the connecting rod 6, for reasons to be hereinafter set forth.

Fig. 2 of the drawing shows a gear rim 1 mounted in accordance with my invention and intermeshing with a single pinion 4. The degree of variation of the rim from a true circular pitch may be represented by a curve D, (Fig. 6) in which the ordinates represent the angular position of a crank pin 7 relatively to a horizontal line 8 and the abscissa represents the degree of variation from the shortest gear radius. If it is assumed that the lateral displacement of the axis of the gear is directly proportional to the thrust upon the connecting rod 6, the displacement may be represented by a curve T, (Fig. 7) having ordinates and abscissæ corresponding to those used in Fig. 6. The relation of the two curves T and D to one another will, then, represent the intermeshing conditions for the pinion 4 and the gear rim 1 for the various relative positions of the rim 1 and the crank pin 7. The worst possible conditions of intermeshing for the pinion occur when the pinion is located in horizontal alinement with the gear axis and intermeshes with the thickest portion of the rim when maximum displacement thereof occurs. This condition is illustrated by the solid curves of Fig. 8 in which a maximum point 10 of the curve D coincides with a maximum point 11 of the curve T. In accordance with my asumption, the prevailing intermeshing conditions for the various relations of the rim, crank pin, and pinion may be represented by a summation curve or curves T and D. With the curves in this assumed relation, the resultant summation curve will obviously have the highest obtainable peak and will, therefore, represent the worst possible intermeshing conditions that could occur. The best obtainable conditions will prevail when the point 10 of the curve D corresponds to the point 13 of the curve T, as shown in dotted outline in Fig. 8 since, for this relation, the summation curve will have the least maximum point. To provide this condition, which is obviously the best obtainable, the maximum point of the curve D is at the greatest mean distance from the maximum point of the curve T, as illustrated in Fig. 2, Fig. 3, and Fig. 8. In Fig. 2, the pinion 4 is located on a radius normal to the direction of thrust upon the crank pin in order that the least obtainable displacement of the gear wheel relative to the pinion may be secured. Fig. 3 shows the best obtainable conditions for a pinion positioned on a radius in the direction of thrust upon the pinion 4. It will be observed that the degree of displacement of the gear wheel relative to the pinion will vary from a maximum in the direction of thrust on the connecting rod to a minimum in a line normal thereto.

If it is desired to find the best intermeshing condition that can be provided for a plurality of pinions that are to intermesh with the same gear wheel, this general law may still be applied. For this case, the variations in thickness of the gear rim relative to the pinions 4 and 5 may be respectively represented by curves D and D′ of Fig. 9 which are displaced in accordance with the displacement of the pinions 4 and 5 on the periphery of the gear wheel. Although it cannot be said that the conditions of intermeshing of the pinion 4 alter the intermeshing conditions of pinion 5, the best obtainable conditions for both pinions will prevail when the maximum point of a curve R, which is a summation curve of D and D′, is disposed at the greatest mean distance from the points 11 of maximum thrust of curve T, as shown in Fig. 9. Fig. 4 shows the gear rim 1 and pinions 4 and 5 mounted in accordance with these conditions.

Figs. 5 and 10 illustrate a modification of my invention in which a rim is purposely mounted in eccentric relation to the hub member in order to compensate for lateral displacement of the gear wheel caused by the thrust upon the connecting rod. For a gear wheel having an eccentric periphery, the variation from a mean radius may be represented by a curve E. This may be combined with the curve T so that the gear-wheel displacement is almost entirely compensated for by the variations in the radius of the gear rim. Fig. 5 shows the method of mounting the gear rim and pinion in order to fulfil the conditions shown in Fig. 10.

It will be evident that, although the invention, as here described, relates directly to gear wheels embodying a separate rim, the invention applies with equal force to gear wheels constructed from a solid piece of material. It is desired that only such limitations shall be imposed as are indicated in the appended claims.

I claim as my invention:

1. A wheel having a non-circular pitch line adapted to exert a periodically varying torque during a complete rotation thereof, and a pinion adapted to operatively engage said wheel at points of substantially least mean radius during the periods of greatest torque.

2. A non-circular wheel provided with a crank pin, said crank pin being interposed between a point of least radius of said wheel and the center thereof.

3. A wheel comprising a rim having an oval pitch line and circular bore, a hub having a crank pin, and a pinion adapted to mesh with said rim, said rim being positioned on said hub relative to said pinion so that said pinion will always engage a point of said rim on the narrow side of said oval pitch line when maximum thrust is applied to said crank pin.

4. A wheel comprising a rim having a thick and a thin portion, a hub having a crank pin, and a pinion operatively engaging said rim, said rim being so placed on said hub that a point on the thin portion of said rim shall always be in engagement with said pinion when the greatest thrust is exerted by said crank pin.

5. A wheel comprising a rim of varying thickness having an oval tooth-pitch line and circular bore, a hub to which said rim is secured, and a pinion meshing with said rim, said wheel being adapted to exert a periodically varying torque, said pinion being adapted to mesh with a thin portion of said rim during the period of greatest torque on said hub.

6. A hub member having a crank pin, a rim adapted to be secured to said hub member having a thick and a thin portion, said thick portion of said rim being mounted in a plane common to the center lines of the crank pin and hub member.

7. A hub member having a crank pin, a distorted rim having a thick and a thin portion, a plurality of pinions intermeshing with said rim, said rim being mounted so that the thick portion shall be at the greatest mean distance from said pinions when maximum thrust is exerted by said crank pin.

8. A hub member having a crank pin, a rim having a thick and a thin portion, and a plurality of pinions intermeshing with said rim, said rim being mounted upon said hub so that the thick spot of said rim shall be at the greatest mean distance from the meshing points of said pinions when the maximum thrust is applied to the crank pin.

9. A driving mechanism comprising a wheel having a periphery at a variable distance from the axis of rotation of said wheel, a pinion operatively engaging said periphery, a crank pin on said wheel, and a rod connected to said crank pin, said crank pin being so located on said wheel that, under operative conditions, the varying distance between said pinion and wheel due to the varying distance of said wheel periphery tends to be neutralized by the displacement of said wheel caused by the crank action.

10. A driving mechanism comprising one or more pinions, a gear wheel meshing therewith, the distance of the pitch line of said wheel from the axis of rotation thereof being variable, a crank pin mounted on said wheel, a connecting rod connected to said pin, said crank pin being so located that the disturbed intermeshing conditions caused by said varying distance of the pitch line will tend to be neutralized by the lateral displacement caused by the crank action.

In testimony whereof, I have hereunto subscribed my name this 27th day of Nov., 1916.

GEORGE M. EATON.